(12) United States Patent
Manninen et al.

(10) Patent No.: US 11,483,357 B2
(45) Date of Patent: Oct. 25, 2022

(54) METHODS FOR AVOIDING FALLBACKS OF A USER EQUIPMENT (UE) TO A LEGACY NETWORK

(71) Applicant: MediaTek Singapore Pte. Ltd., Singapore (SG)

(72) Inventors: Jani Raimo Ensio Manninen, Oulu (FI); Marko Niemi, Oulu (FI); Kristian Alexander Lappalainen, Oulu (FI); Sami Jutila, Oulu (FI)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 42 days.

(21) Appl. No.: 16/862,876

(22) Filed: Apr. 30, 2020

(65) Prior Publication Data

US 2020/0382565 A1 Dec. 3, 2020

Related U.S. Application Data (60) Provisional application No. 62/855,008, filed on May 31, 2019.

(51) Int. Cl.

| H04L 65/1073 | (2022.01) |
|---|---|
| H04W 48/18 | (2009.01) |
| H04L 65/1016 | (2022.01) |
| H04L 65/1104 | (2022.01) |
| H04W 60/00 | (2009.01) |

(52) U.S. Cl.
CPC ...... *H04L 65/1073* (2013.01); *H04L 65/1016* (2013.01); *H04L 65/1104* (2022.05); *H04W 48/18* (2013.01); *H04W 60/00* (2013.01)

(58) Field of Classification Search
CPC ............. H04L 65/1073; H04L 65/1006; H04L 65/1016; H04W 48/18; H04W 60/00
See application file for complete search history.

(56) References Cited

U.S. PATENT DOCUMENTS

| 10,869,244 | B2* | 12/2020 | Kim | H04W 36/34 |
|---|---|---|---|---|
| 2016/0192251 | A1* | 6/2016 | Chebolu | H04W 48/16 |
| | | | | 455/404.1 |
| 2019/0281506 | A1* | 9/2019 | Chiang | H04W 12/71 |
| 2021/0176817 | A1* | 6/2021 | Takakura | H04W 48/18 |

FOREIGN PATENT DOCUMENTS

| CN | 102404815 A | 4/2012 |
|---|---|---|
| CN | 102404815 A | 4/2012 |
| WO | 2017203118 A1 | 11/2017 |
| WO | 2018231813 A1 | 12/2018 |

OTHER PUBLICATIONS

Chinese Language Office Action dated Apr. 16, 2021, issued in Application No. 109116521.

* cited by examiner

*Primary Examiner* — Wayne H Cai
(74) *Attorney, Agent, or Firm* — McClure, Qualey & Rodack, LLP (57) ABSTRACT

A method executed by a UE communicatively connected to a first 3rd Generation Partnership Project (3GPP) network utilizing an advanced Radio Access Technology (RAT) is provided. The methods includes the following steps: receiving a message from the first 3GPP network, which indicates that the first 3GPP network supports IP Multimedia Subsystem (IMS) voice over Packet Switched (PS) sessions; and providing an indication that fallback of the UE to a second 3GPP network utilizing a legacy RAT is disabled to the first 3GPP network in response to the receiving of the message.

14 Claims, 7 Drawing Sheets

FIG. 7

METHODS FOR AVOIDING FALLBACKS OF A USER EQUIPMENT (UE) TO A LEGACY NETWORK

CROSS REFERENCE TO RELATED APPLICATIONS

This Application claims priority of U.S. Provisional Application No. 62/855,008, filed on May 31, 2019, the entirety of which is incorporated by reference herein.

BACKGROUND OF THE APPLICATION

Field of the Application

The application generally relates to wireless communications, and more particularly, to methods for avoiding fallbacks of a User Equipment (UE) to a legacy network.

Description of the Related Art

In a typical mobile communication environment, a User Equipment (UE) (also called Mobile Station (MS)), such as a mobile telephone (also known as a cellular or cell phone), or a tablet Personal Computer (PC) with wireless communications capability, may communicate voice and/or data signals with one or more service networks. Wireless communications between the UE and the service networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc. In particular, GSM/GPRS/EDGE technology is also called 2G technology; WCDMA/CDMA-2000/TD-SCDMA technology is also called 3G technology; and LTE/LTE-A/TD-LTE technology is also called 4G technology.

These RAT technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

According to the 3GPP specifications and/or requirements in compliance with the 5G NR technology, a UE camped on a 5G network may be triggered by the 5G network to fall back to a 4G network to receive a Mobile Terminated (MT) voice call if the 5G network supports IP Multimedia Subsystem (IMS) voice over Packet Switched (PS) sessions but for some reasons cannot provide the IMS call service natively. However, there are situations where the UE may be performing a critical operation that requires the UE to stay connected to the 5G network during the operation. As a result, the fallback of the UE to a 4G network may cause disconnection with the 5G network and impact the critical operation.

BRIEF SUMMARY OF THE APPLICATION

In order to solve the aforementioned problem, the present application proposes specific ways to configure the UE and/or the serving network (e.g., a 5G network) not to perform fallback of the UE to a legacy network (e.g., a 4G network).

In one aspect of the application, a method executed by a UE communicatively connected to a first 3rd Generation Partnership Project (3GPP) network utilizing an advanced Radio Access Technology (RAT) is provided. The method comprises the following steps: receiving a message from the first 3GPP network, which indicates that the first 3GPP network supports IP Multimedia Subsystem (IMS) voice over Packet Switched (PS) sessions; and providing an indication that fallback of the UE to a second 3GPP network utilizing a legacy RAT is disabled to the first 3GPP network in response to the receiving of the message indicating that the first 3GPP network supports IMS voice over PS sessions.

In another aspect of the application, a method executed by a first 3GPP network which utilizes an advanced RAT and is communicatively connected to a UE is provided. The method comprises the following steps: sending a message to the UE, which indicates that the first 3GPP network supports IMS voice over PS sessions; allowing an IMS registration from the UE in response to the first 3GPP network supporting IMS voice over PS sessions; and providing an indication that an incoming call for the UE is going to be established in a second 3GPP network utilizing a legacy RAT in response to initiating the incoming call.

Other aspects and features of the present application will become apparent to those with ordinarily skill in the art upon review of the following descriptions of specific embodiments of the methods for avoiding fallbacks of a UE to a legacy network.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
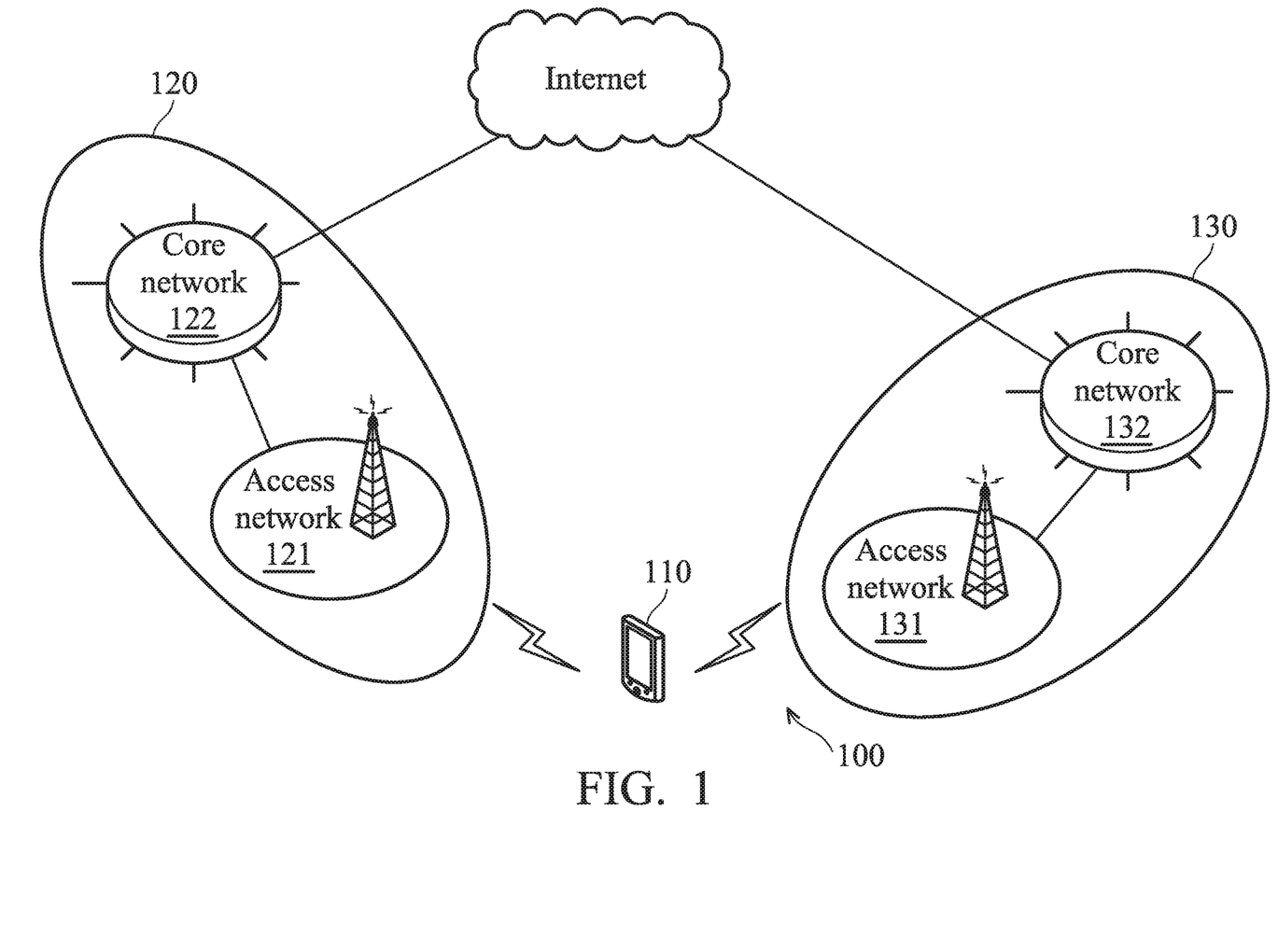
FIG. 1 is a block diagram of a wireless communication environment according to an embodiment of the application.

FIG. 1 is a block diagram of a wireless communication environment according to an embodiment of the application.

As shown in FIG. 1, the wireless communication environment 100 includes a User Equipment (UE) 110 and two 3GPP networks 120 and 130.

The UE 110 may be a feature phone, a smartphone, a tablet Personal Computer (PC), a laptop computer, or any wireless communication device supporting the RATs utilized by the 3GPP networks 120 and 130. The UE 110 may wirelessly communicate with one or both the 3GPP networks 120 and 130.

Specifically, the RAT utilized by the 3GPP network 120 is more advanced than the RAT utilized by the 3GPP network 130. That is the 3GPP network 120 is a more advanced network than the 3GPP network 130.

For example, the 3GPP network 120 may be a 5G network (e.g., an NR network), and the 3GPP network 130 may be a 4G network (e.g., an LTE/LTE-A/TD-LTE network) or a 3G network (e.g., a WCDMA/CDMA-2000/TD-SCDMA network).

Specifically, the 3GPP network 120 includes an access network 121 and a core network 122, while the 3GPP network 130 includes an access network 131 and a core network 132. The access networks 121 and 131 are responsible for processing radio signals, terminating radio protocols, and connecting the UE 110 with the core networks 122 and 132, respectively. The core networks 122 and 132 are responsible for performing mobility management, network-side authentication, and interfaces with public/external networks (e.g., the Internet).

The access networks 121 and 131 and the core networks 122 and 132 may each include one or more network nodes for carrying out said functions. For example, if the 3GPP network 120 is an NR network, the access network 121 may be a Next Generation Radio Access Network (NG-RAN) which includes at least a gNB or Transmission Reception Point (TRP), and the core network 122 may be a Next Generation Core Network (NG-CN) which includes various network functions, including an Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session.

The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

For example, if the 3GPP network 130 is an LTE/LTE-A/TD-LTE network, the access network 131 may be an Evolved-UTRAN (E-UTRAN) which includes at least an evolved NB (eNB) (e.g., a macro eNB, femto eNB, or pico eNB), and the core network 132 may be an Evolved Packet Core (EPC) which includes a Home Subscriber Server (HSS), Mobility Management Entity (MME), Serving Gateway (S-GW), and Packet Data Network Gateway (PDN-GW or P-GW).

Alternatively, if the 3GPP network 130 is a WCDMA network, the access network 121 may be a Universal Terrestrial Radio Access Network (UTRAN) and the core network 122 may be a GPRS core which includes a Home Location Register (HLR), at least one Serving GPRS Support Node (SGSN), and at least one Gateway GPRS Support Node (GGSN).

More specifically, both the 3GPP networks 120 and 130 support IP Multimedia Subsystem (IMS) voice over Packet Switched (PS) sessions, and the 3GPP network 120 supports the fallback procedure that is performed to fall back the UE 110 from the 3GPP network 120 to the 3GPP network 130 for IP Multimedia Subsystem (IMS) call service. For example, if the 3GPP network is a NR network and the 3GPP network 130 is an LTE network, the fallback procedure is called an Evolved Packet System (EPS) fallback. Although not shown, each of the 3GPP networks 120 and 130 may include an IMS server which may be connected to or disposed in the core network 122/132.

However, for some reasons, the 3GPP network 120 may not be able to provide the IMS call service natively to the UE 110, and this is where the methods of the present application kick in to avoid fallbacks of the UE 110 from the 3GPP network 120 to the 3GPP network 130 when the UE 110 is performing a critical operation.

It should be understood that the description of the wireless communication environment 100 is for illustrative purposes only and is not intended to limit the scope of the application. For example, the 3GPP network 120 may be a 6G network and the 3GPP network 130 may be a 5G network, if the 6G technology supports fallback of the UE 110 from a 6G network to a 5G network.

Figure 2:
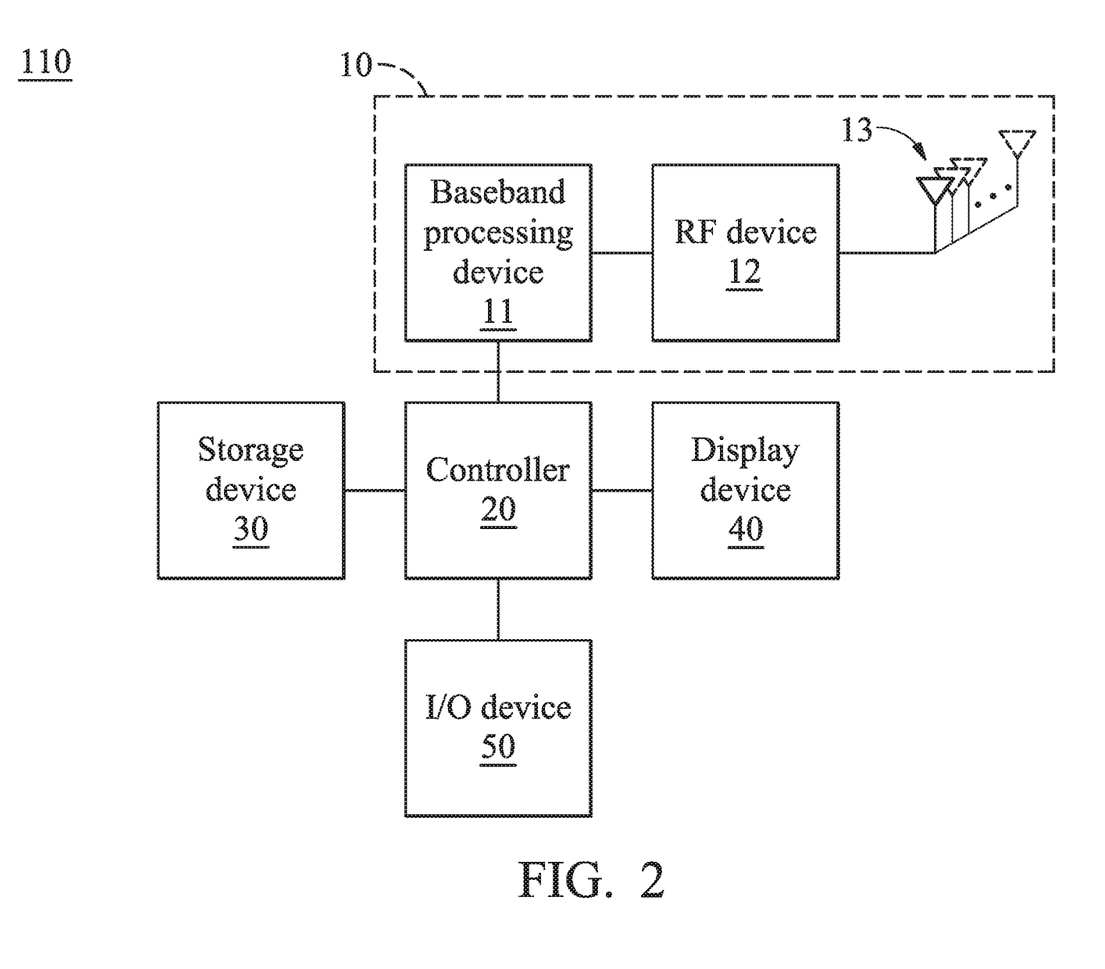
FIG. 2 is a block diagram illustrating the UE 110 according to an embodiment of the application.

FIG. 2 is a block diagram illustrating the UE 110 according to an embodiment of the application.

The UE 110 may include a wireless transceiver 10, a controller 20, a storage device 30, a display device 40, and an Input/Output (I/O) device 50.

The wireless transceiver 10 is configured to perform wireless transmission and reception to and from the access network 121 and/or the access network 131.

Specifically, the wireless transceiver 10 may include a baseband processing device 11, a Radio Frequency (RF) device 12, and antenna(s) 13, wherein the antenna(s) 13 may include one or more antennas for beamforming. The baseband processing device 11 is configured to perform baseband signal processing and control the communications between subscriber identity card(s) (not shown) and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 12 may receive RF wireless signals via the antenna(s) 13, convert the received RF wireless signals to baseband signals, which are processed by the baseband processing device 11, or receive baseband signals from the baseband processing device 11 and convert the received baseband signals to RF wireless signals, which are later transmitted via the antenna(s) 13. The RF device 12 may also contain multiple hardware devices to perform radio frequency conversion. For example, the RF device 12 may include a mixer to multiply the baseband signals with a carrier oscillated in the radio frequency of the supported cellular technologies, wherein the radio frequency may be 900 MHz, 1900 MHz or 2100 MHz utilized in 3G (e.g., WCDMA) systems, or may be 900 MHz, 2100 MHz, or 2.6 GHz utilized in 4G (e.g., LTE/LTE-A/TD-LTE) systems, or may be any radio frequency (e.g., 30 GHz-300 GHz for mmWave) utilized in 5G (e.g., NR) systems, or another radio frequency, depending on the RAT in use.

In another embodiment, the wireless transceiver 10 may include multiple sets of a baseband processing device, an RF device, and an antenna, wherein each set of a baseband processing device, an RF device, and an antenna is configured to perform wireless transmission and reception using a respective RAT.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communication with the access network 121 and/or the access network 131, enabling the storage device 30 and storing and retrieving data to and from the storage device 30, sending a series of frame data (e.g. representing text messages, graphics, images, etc.) to the display device 40, and receiving/outputting signals from/to the I/O device 50.

In particular, the controller 20 coordinates the aforementioned operations of the wireless transceiver 10, the storage device 30, the display device 40, and the I/O device 50 for performing the methods for avoiding fallbacks of the UE 110 to a legacy network.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of operating system(s), applications, communication protocols, and/or the methods of the present application (or the methods of the present application may be realized as part of the communication protocols).

The display device 40 may be a Liquid-Crystal Display (LCD), a Light-Emitting Diode (LED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users, such as receiving user inputs, and outputting prompts to users.

It should be understood that the components described in the embodiment of FIG. 2 are for illustrative purposes only and are not intended to limit the scope of the application. For example, the UE 110 may include more components, such as a power supply, or a Global Positioning System (GPS) device, wherein the power supply may be a mobile/replaceable battery providing power to all the other components of the UE 110, and the GPS device may provide the location information of the UE 110 for use of some location-based services or applications. Alternatively, the UE 110 may include fewer components. For example, the UE 110 may not include the display device 40 and/or the I/O device 50.

Figure 3:
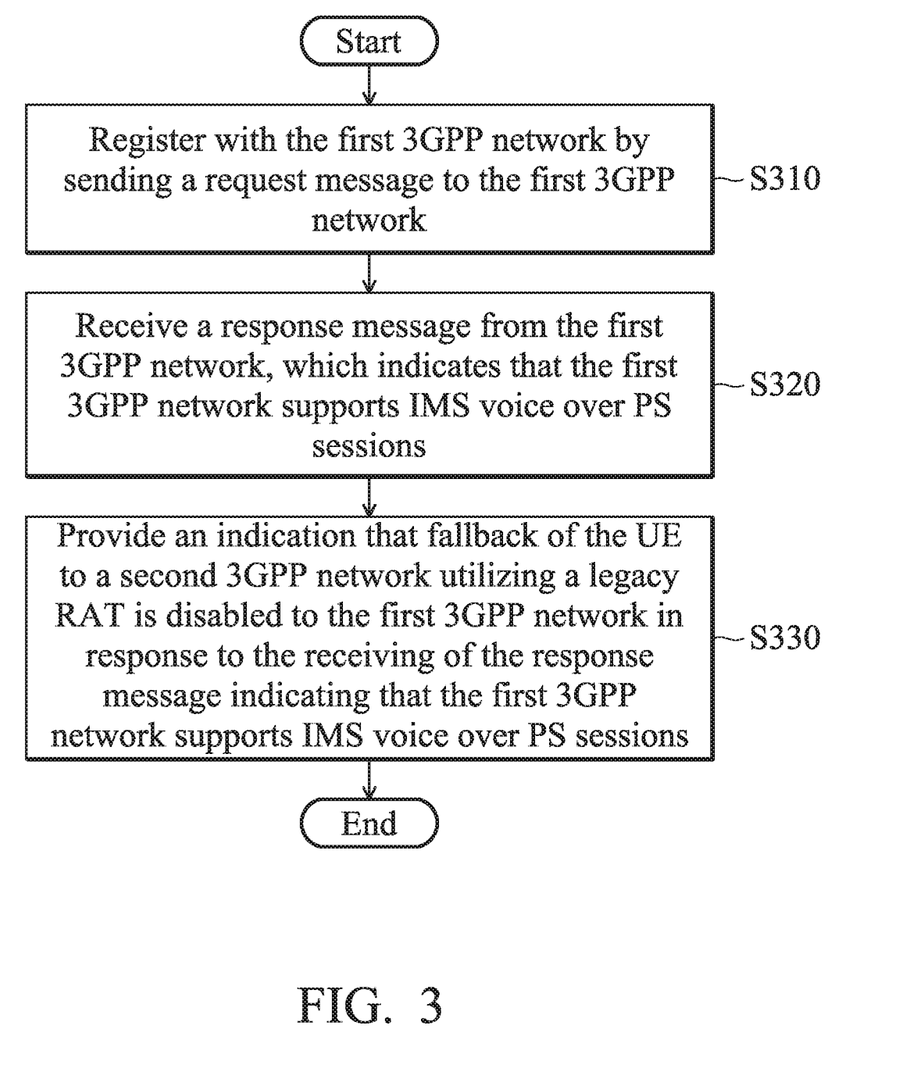
FIG. 3 is a flow chart illustrating the method for avoiding fallbacks of the UE to a legacy network according to an embodiment of the application.

FIG. 3 is a flow chart illustrating the method for avoiding fallbacks of the UE to a legacy network according to an embodiment of the application.

In this embodiment, the method for avoiding fallbacks of the UE to a legacy network is applied to and executed by a UE (e.g., the UE 110). Specifically, the UE is communicatively connected to a first 3GPP network (e.g., the 3GPP network 120) utilizing an advanced RAT (e.g., 5G NR).

To begin with, the UE registers with the first 3GPP network by sending a request message to the first 3GPP network (step S310). In one embodiment, the request message may be a REGISTRATION REQUEST message.

Subsequent to step S310, the UE receives a response message from the first 3GPP network, which indicates that the first 3GPP network supports IMS voice over PS sessions (step S320). In one embodiment, the response message may be a REGISTRATION ACCEPT message.

Subsequent to step S320, the UE provides an indication that fallback of the UE to a second 3GPP network utilizing a legacy RAT is disabled to the first 3GPP network in response to the receiving of the response message indicating that the first 3GPP network supports IMS voice over PS sessions (step S330), and the method ends.

In one embodiment, the indication that fallback of the UE to a second 3GPP network utilizing a legacy RAT is disabled may be provided to the first 3GPP network in response to detecting an IMS voice session being initiated. The details of this embodiment will be given later in FIG. 4.

In another embodiment, the indication that fallback of the UE to a second 3GPP network utilizing a legacy RAT is disabled may be provided to the first 3GPP network at IMS registration over the first 3GPP network. The details of this embodiment will be given later in FIG. 5.

Figure 4:
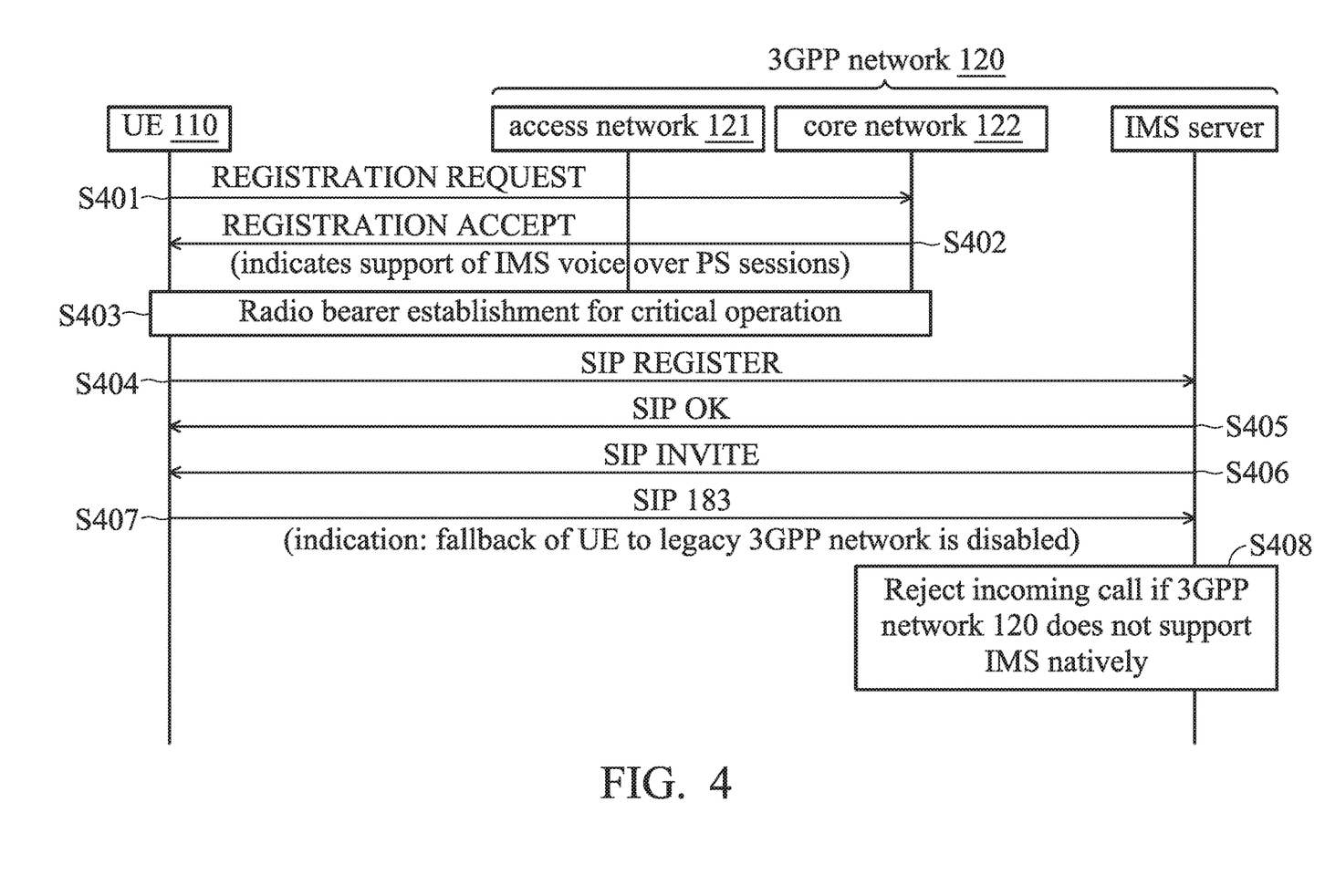
FIG. 4 is a message sequence chart illustrating the method for avoiding fallbacks of the UE to a legacy network according to the embodiment of FIG. 3.

FIG. 4 is a message sequence chart illustrating the method for avoiding fallbacks of the UE to a legacy network according to the embodiment of FIG. 3.

In step S401, the UE 110 sends a REGISTRATION REQUEST message to the core network 122 to register with the 3GPP network 120.

In step S402, the UE 110 receives a REGISTRATION ACCEPT message from the core network 122, wherein the REGISTRATION ACCEPT message indicates that the 3GPP network 120 supports IMS voice over PS sessions.

In step S403, the UE 110 establishes one or more radio bearers with the 3GPP network 120 for performing a critical operation.

Specifically, the critical operation may be associated with a Low-Latency Communication (LLC) application, such as a gaming application.

In step S404, the UE 110 sends a Session Initiation Protocol (SIP) REGISTER message to the IMS server of the 3GPP network 120 to register the IMS call service in response to the UE 110 being configured as "voice centric" and the 3GPP network 120 supporting IMS voice over PS sessions.

In step S405, the UE 110 receives a SIP OK message from the IMS server of the 3GPP network 120 to complete the IMS registration.

In step S406, the UE 110 receives a SIP INVITE message from the IMS server of the 3GPP network 120, wherein the SIP INVITE message indicates an incoming call for the UE 110.

In step S407, the UE sends a SIP 183 message to the IMS server of the 3GPP network 120, wherein the SIP 183 message includes a Feature-Caps header field in which a specific tag is present to provide the indication that fallback of the UE 110 to a legacy 3GPP network (e.g., the 3GPP network 130) is disabled.

For example, the specific tag may be a "g.3gpp.epsfb-forbid" tag, a "g.3gpp.epsfb-disallow" tag, a "g.3gpp.noepsfb" tag, or a "g.3gpp.ps-fallback-forbid" tag.

In step S408, the incoming call is rejected at the IMS server of the 3GPP network 120 in response to the 3GPP network 120 not supporting IMS voice over PS sessions natively and receiving the SIP 183 message including the indication that fallback of the UE 110 to a legacy 3GPP network (e.g., the 3GPP network 130) is disabled. For some reasons, the 3GPP network 120 may not supports IMS voice over PS sessions natively (i.e., EPS fallback is the only option). For example, the IMS server of the 3GPP network 120 may be under maintenance when the incoming call for the UE 110 is initiated, or the operator of the 3GPP network 120 may want to exploit the IMS service of a legacy 3GPP network (e.g., the 3GPP network 130) more often.

In another embodiment, if the 3GPP network 120 supports IMS voice over PS sessions natively when the incoming call for the UE 110 is initiated, the 3GPP network 120 may continue with a call setup procedure.

Figure 5:
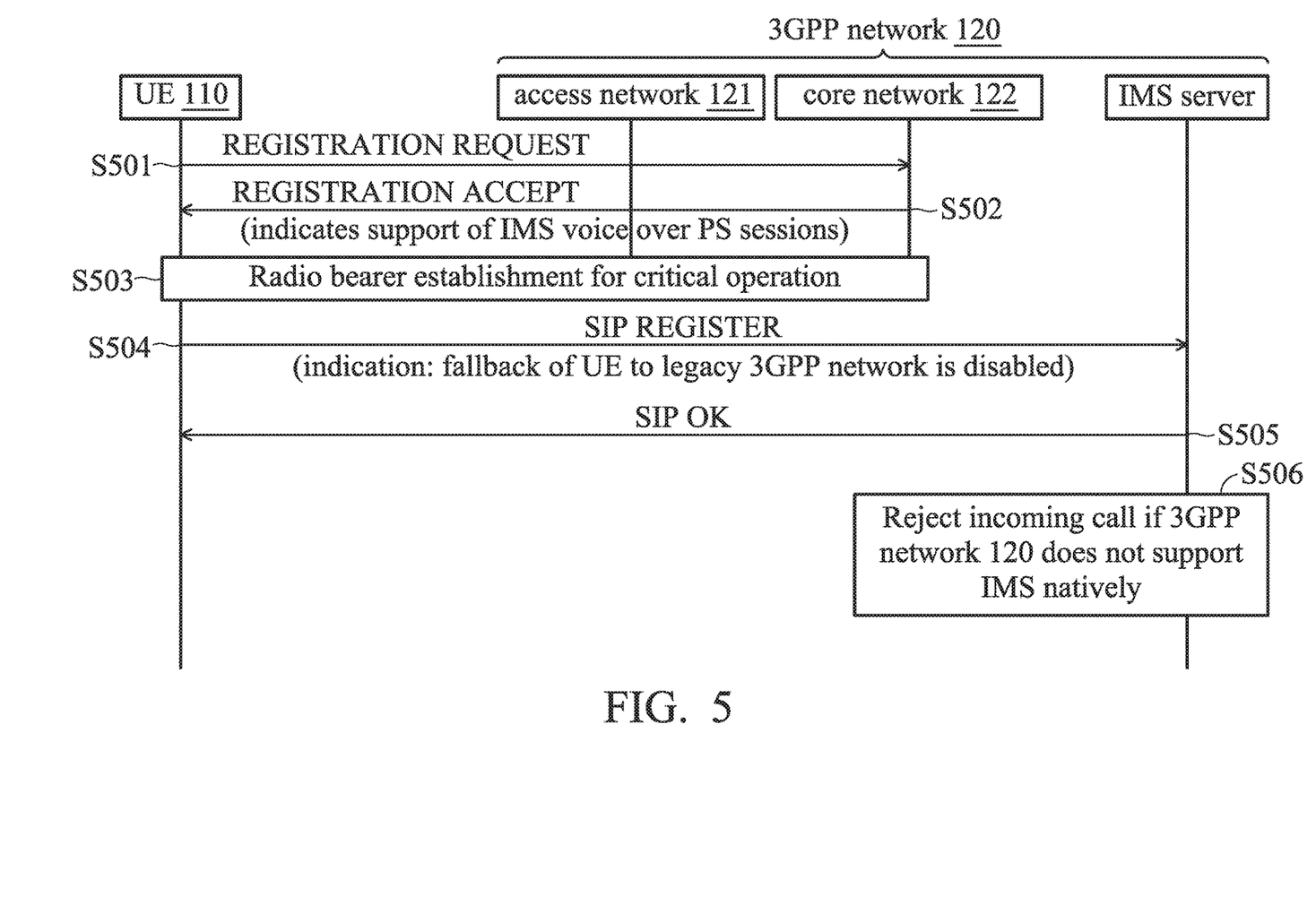
FIG. 5 is another message sequence chart illustrating the method for avoiding fallbacks of the UE to a legacy network according to the embodiment of FIG. 3.

FIG. 5 is another message sequence chart illustrating the method for avoiding fallbacks of the UE to a legacy network according to the embodiment of FIG. 3.

In step S501, the UE 110 sends a REGISTRATION REQUEST message to the core network 122 to register with the 3GPP network 120.

In step S502, the UE 110 receives a REGISTRATION ACCEPT message from the core network 122, wherein the REGISTRATION ACCEPT message indicates that the 3GPP network 120 supports IMS voice over PS sessions.

In step S503, the UE 110 establishes one or more radio bearers with the 3GPP network 120 for performing a critical operation.

Specifically, the critical operation may be associated with an LLC application, such as a gaming application.

In step S504, the UE 110 sends a SIP REGISTER message to the IMS server of the 3GPP network 120 to register the IMS call service in response to the UE 110 being configured as "voice centric" and the 3GPP network 120 supporting IMS voice over PS sessions.

Specifically, the SIP REGISTER message includes a Contact header field in which a specific tag is absent or present to provide the indication that fallback of the UE 110 to a legacy 3GPP network (e.g., the 3GPP network 130) is disabled.

In one embodiment, the specific tag may be a "g.3gpp.epsfb" tag or a "g.3gpp.ps-fallback" tag, which when absent, indicates that fallback of the UE 110 to a legacy 3GPP network is disabled.

In another embodiment, the specific tag may be a "g.3gpp.epsfb-forbid" tag, a "g.3gpp.epsfb-disallow" tag, a "g.3gpp.noepsfb" tag, or a "g.3gpp.ps-fallback-forbid" tag, which when present, indicates that fallback of the UE 110 to a legacy 3GPP network is disabled. Please note that, if this embodiment of including a positive indication in the SIP REGISTER message is applied, the UE 110 may need to re-register the IMS call service to allow EPS fallback when the critical operation ends.

In step S505, the UE 110 receives a SIP OK message from the IMS server of the 3GPP network 120 to complete the IMS registration.

In step S506, the incoming call is rejected at the IMS server of the 3GPP network 120 in response to the 3GPP network 120 not supporting IMS voice over PS sessions natively and receiving the SIP REGISTER message including the indication that fallback of the UE 110 to a legacy 3GPP network (e.g., the 3GPP network 130) is disabled. For some reasons, the 3GPP network 120 may not supports IMS voice over PS sessions natively (i.e., EPS fallback is the only option). For example, the IMS server of the 3GPP network 120 may be under maintenance when the incoming call for the UE 110 is initiated, or the operator of the 3GPP network 120 may want to exploit the IMS service of a legacy 3GPP network (e.g., the 3GPP network 130) more often.

In another embodiment, if the 3GPP network 120 supports IMS voice over PS sessions natively when the incoming call for the UE 110 is initiated, the 3GPP network 120 may continue with a call setup procedure.

In view of the forgoing embodiments of FIGS. 3-5, it will be appreciated that the present application realizes avoiding the fallbacks of the UE from an advanced 3GPP network to a legacy 3GPP network, by allowing the UE to provide an indication that fallback of the UE to a legacy 3GPP network is disabled. Advantageously, the UE may stay connected with the advanced 3GPP network to keep the critical operation ongoing without being interrupted by the IMS incoming call that may trigger the fallback to the legacy 3GPP network.

Figure 6:
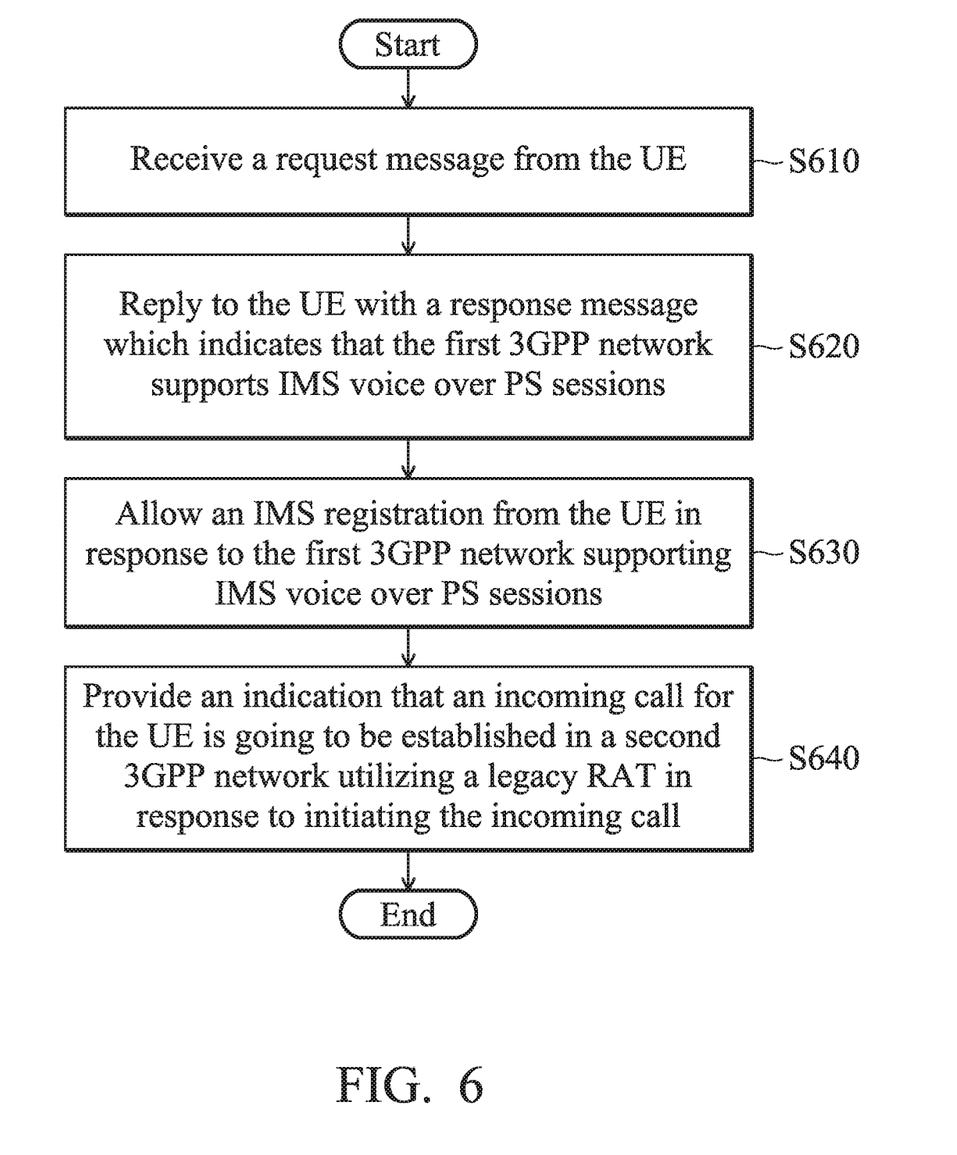
FIG. 6 is a flow chart illustrating the method for avoiding fallbacks of the UE to a legacy network according to another embodiment of the application.

FIG. 6 is a flow chart illustrating the method for avoiding fallbacks of the UE to a legacy network according to another embodiment of the application.

In this embodiment, the method for avoiding fallbacks of the UE to a legacy network is applied to and executed by a first 3GPP network (e.g., the 3GPP network 120). Specifically, the first 3GPP network is communicatively connected to a UE (e.g., the UE 110).

To begin with, the first 3GPP network receives a request message from the UE (step S610). In one embodiment, the request message may be a REGISTRATION REQUEST message.

Subsequent to step S610, the first 3GPP network replies to the UE with a response message which indicates that the first 3GPP network supports IMS voice over PS sessions (step S620). In one embodiment, the response message may be a REGISTRATION ACCEPT message.

Subsequent to step S620, the first 3GPP network allows an IMS registration from the UE in response to the first 3GPP network supporting IMS voice over PS sessions (step S630).

Subsequent to step S630, the first 3GPP network provides an indication that an incoming call for the UE is going to be established in a second 3GPP network utilizing a legacy RAT in response to initiating the incoming call (step S640), and the method ends.

In one embodiment, the first 3GPP network may provide the indication that the incoming call for the UE is going to be established in the second 3GPP network, if the first 3GPP network for some reasons cannot provide the IMS call service natively. For example, the IMS server of the first 3GPP network is under maintenance when an incoming call for the UE is initiated, or the operator of the first 3GPP network may want to exploit the IMS service of the second 3GPP network more often.

In one embodiment, the indication that the incoming call for the UE is going to be established in the second 3GPP network may be provided to the UE in a SIP message. The details of this embodiment will be given later in FIG. 7.

Figure 7:
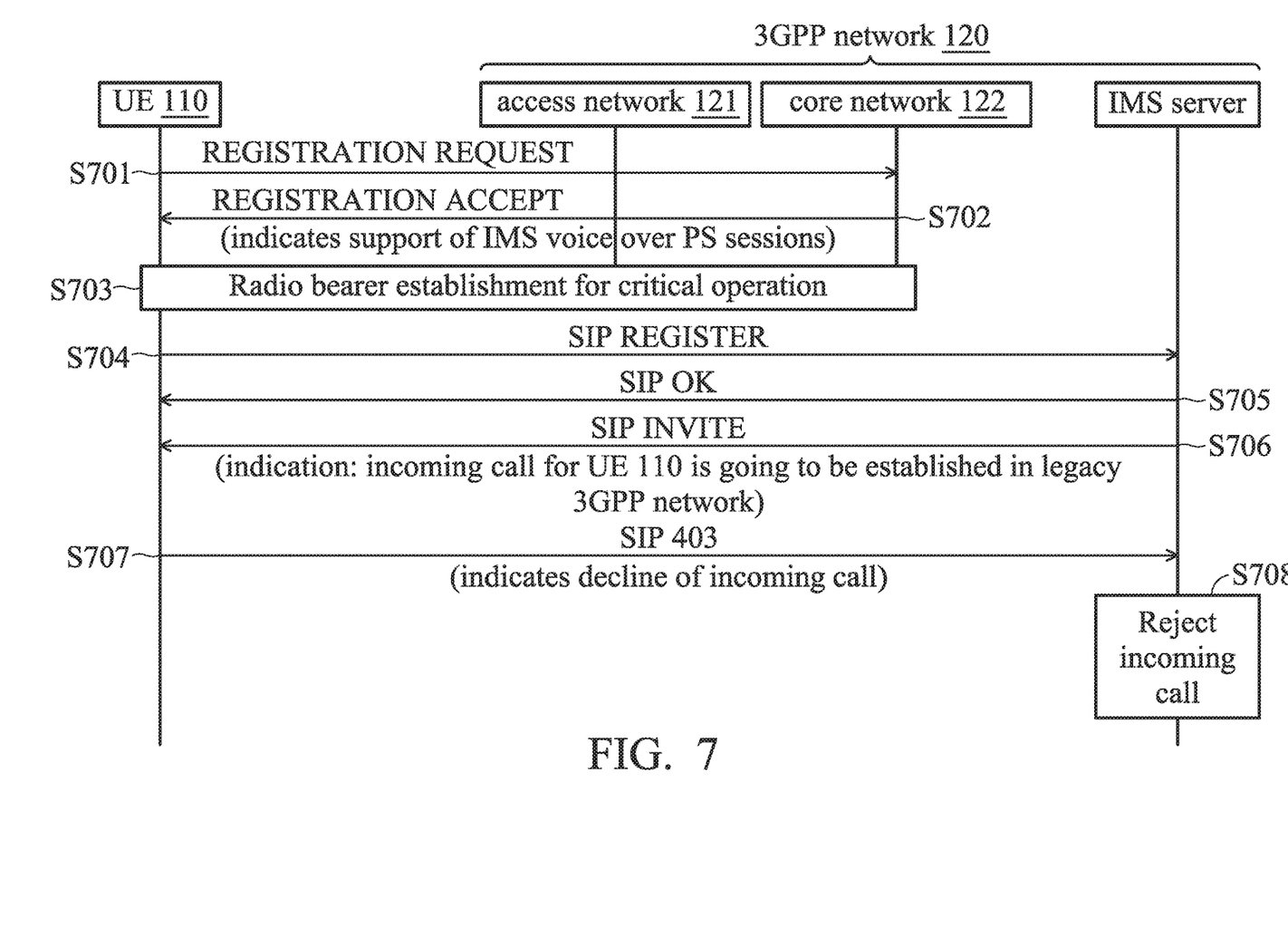
FIG. 7 is a message sequence chart illustrating the method for avoiding fallbacks of the UE to a legacy network according to the embodiment of FIG. 6.

FIG. 7 is a message sequence chart illustrating the method for avoiding fallbacks of the UE to a legacy network according to the embodiment of FIG. 6.

In step S701, the core network 122 receives a REGISTRATION REQUEST message from the UE 110.

In step S702, the core network 122 replies to the UE 110 with a REGISTRATION ACCEPT message which indicates that the 3GPP network 120 supports IMS voice over PS sessions.

In step S703, the UE 110 establishes one or more radio bearers with the 3GPP network 120 for performing a critical operation.

Specifically, the critical operation may be associated with an LLC application, such as a gaming application.

In step S704, the UE 110 sends a SIP REGISTER message to the IMS server of the 3GPP network 120 to register the IMS call service in response to the UE 110 being configured as "voice centric" and the 3GPP network 120 supporting IMS voice over PS sessions.

In step S705, the UE 110 receives a SIP OK message from the IMS server of the 3GPP network 120 to complete the IMS registration.

In step S706, the IMS server of the 3GPP network 120 sends a SIP INVITE message to the UE 110, wherein the SIP INVITE message indicates that an incoming call for the UE 110 is going to be established in the 3GPP network 130 which is a legacy 3GPP network.

In step S707, the IMS server of the 3GPP network 120 receives a SIP 403 message from the UE 110, wherein the SIP 403 message indicates that the incoming call is declined by the UE 110.

In step S708, the incoming call is rejected at the IMS server of the 3GPP network 120 in response to receiving the SIP 403 message indicating decline of the incoming call.

In view of the forgoing embodiments of FIGS. 6-7, it will be appreciated that the present application realizes avoiding the fallbacks of the UE from an advanced 3GPP network to a legacy 3GPP network, by allowing the advanced 3GPP network to provide an indication that an incoming call for the UE is going to be established in the legacy 3GPP network. Advantageously, the UE may choose to decline the incoming call and stay connected with the advanced 3GPP network to keep the critical operation ongoing without being interrupted by the IMS incoming call that may trigger the fallback to the legacy 3GPP network.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A method, executed by a User Equipment (UE) supporting an advanced Radio Access Technology (RAT) and a legacy RAT and communicatively connected to a first 3rd Generation Partnership Project (3GPP) network utilizing the advanced RAT, comprising:
   sending, by the UE, a request message to the first 3GPP network;
   receiving, by the UE, a response message from the first 3GPP network, which indicates that the first 3GPP network supports IP Multimedia Subsystem (IMS) voice over Packet Switched (PS) sessions; and
   providing, by the UE, an indication indicating that fallback of the UE to a second 3GPP network utilizing a legacy RAT is disabled to the first 3GPP network, in response to the receiving of the response message indicating that the first 3GPP network supports IMS voice over PS sessions.

2. The method as claimed in claim 1, wherein the providing of the indication that fallback of the UE to the second 3GPP network is disabled is performed in response to detecting an IMS voice session being initiated.

3. The method as claimed in claim 1, wherein the providing of the indication that fallback of the UE to the second 3GPP network is disabled is performed at IMS registration over the first 3GPP network.

4. The method as claimed in claim 1, wherein the indication that fallback of the UE to the second 3GPP network is disabled is provided in a Session Initiation Protocol (SIP) message.

5. The method as claimed in claim 4, wherein the SIP message is a SIP 183 message.

6. The method as claimed in claim 5, wherein the SIP 183 message comprises a Feature-Caps header field comprising the indication that fallback of the UE to the second 3GPP network is disabled.

7. The method as claimed in claim 6, wherein the indication that fallback of the UE to the second 3GPP network is disabled refers to a "g.3gpp.epsfb-forbid" or "g.3gpp.epsfb-disallow" or "g.3gpp.noepsfb" or "g.3gpp.ps-fallback-forbid" tag being present in the Feature-Caps header field of the SIP 183 message.

8. The method as claimed in claim 4, wherein the SIP message is a SIP REGISTER message.

9. The method as claimed in claim 8, wherein the SIP REGISTER message comprises a Contact header field comprising the indication that fallback of the UE to the second 3GPP network is disabled.

10. The method as claimed in claim 9, wherein the indication that fallback of the UE to the second 3GPP network is disabled refers to a "g.3gpp.epsfb" or "g.3gpp.ps-fallback" tag being absent in the Contact header field of the SIP REGISTER message, or refers to a "g.3gpp.epsfb-forbid" or "g.3gpp.epsfb-disallow" or "g.3gpp.noepsfb" or "g.3gpp.ps-fallback-forbid" tag being present in the Contact header field of the SIP REGISTER message.

11. The method as claimed in claim 1, wherein the providing of the indication that fallback of the UE to the second 3GPP network is disabled is performed in response to the UE's usage setting being "voice centric" and the UE performing a predetermined operation with the first 3GPP network.

12. The method as claimed in claim 11, wherein the predetermined operation is associated with a Low-Latency Communication (LLC) application.

13. The method as claimed in claim 1, wherein the message is a REGISTRATION ACCEPT message.

14. The method as claimed in claim 1, the first RAT is a fifth generation (5G) RAT, while the second RAT is a 2G, 3G, or 4G RAT.

* * * * *